United States Patent [19]

Tang et al.

[11] Patent Number: 5,239,373
[45] Date of Patent: Aug. 24, 1993

[54] VIDEO COMPUTATIONAL SHARED DRAWING SPACE

[75] Inventors: John C. Tang, Palo Alto; Scott L. Minneman, San Francisco; Sara A. Bly, Mountain View; Steve R. Harrison, Portola Valley, all of Calif.

[73] Assignee: Xerox Corporation, Stamford, Conn.

[21] Appl. No.: 633,900

[22] Filed: Dec. 26, 1990

[51] Int. Cl.[5] .............................................. H04N 7/18
[52] U.S. Cl. ........................................ 358/93; 178/18; 358/903; 340/706
[58] Field of Search ....................... 358/93, 84, 83, 85, 358/108, 496, 494, 487; 178/18, 19, 20; 434/307, 323, 322; 340/706, 707, 712; 375/53, 54, 93, 96

[56] References Cited

U.S. PATENT DOCUMENTS 3,584,162 6/1971 Schoeffer ............................. 375/53
3,618,035 11/1971 Simms, Jr. ............................. 375/53

(List continued on next page.)

FOREIGN PATENT DOCUMENTS 2433667 1/1976 Fed. Rep. of Germany ........ 379/53
2628709 12/1977 Fed. Rep. of Germany ........ 379/53

OTHER PUBLICATIONS

Paul Milgram et al., "A Virtual Stereographic Pointer for a Real Three Dimensional Video World", INTER-ACT '90, August 1990.

(List continued on next page.)

Primary Examiner—Victor R. Kostak
Assistant Examiner—Michael Lee
Attorney, Agent, or Firm—Anglin & Giaccherini

[57] ABSTRACT

The present invention comprises a display unit (10) which displays a composite image (38); a stylus (24) which is used to "write" on the composite image (38); a way of detecting (20) the position of the stylus (24) over the composite image (38); a video camera (12) mounted a short distance away from the video display (11) and aimed at the composite image (38); a light (23) which provides uniform illumination to the composite image (38); a mechanism for preventing video feedback (26); and a computer (22). A special configuration of cables (16, 28, 30, 32, 34) is used to interconnect the display (10), the stylus (24), the position detector (20), the video camera (12) and the computer (22). Two or more workstations (11) can be electrically connected to each other via cables (34) or over a network (76). Many variations of this invention can be created by connecting other components into the computer network (76). Various combinations of video mixers (39) and video buses (78) can be utilized instead of directly connecting the video cameras (12) to the computers (22) with cables (16). Three dimensional effects can be created by employing a second video camera (112), adjacent to the first (12), in combination with a pair of shuttering spectacles (102). Images of additional objects (98) can be provided by extra cameras (70) electrically connected in several different ways to the network. To enhance communication between operators (25) separated by large distances, microphones (74), loudspeakers (72), auxiliary cameras (70) and auxiliary video displays (66) can be provided at each workstation (11). Large scale versions of this invention can be constructed. In large scale versions the video display unit (10) is replaced with a large screen (88) and a video projector (90).

16 Claims, 18 Drawing Sheets

U.S. PATENT DOCUMENTS

| | | | |
|---|---|---|---|
| 3,755,623 | 8/1973 | Cassagne | 358/85 |
| 4,371,893 | 2/1983 | Rabeisen | 358/93 |
| 4,400,724 | 8/1983 | Fields | 358/85 |
| 4,430,526 | 2/1984 | Brown et al. | 375/53 |
| 4,561,017 | 12/1985 | Greene | 353/93 |
| 4,821,118 | 4/1989 | Lafreniere | 358/93 |
| 5,073,926 | 12/1991 | Suzuki et al. | 358/85 |

OTHER PUBLICATIONS

Nichon, Brian, "Integrating Motion Video into Computational Environments", October 1989, SIGCHI Bulletin, pps 80–82.

Hiroshi Ishii, "Team Work Station: Towards a Seamless Shared Workspace", October 1990, CSCW '90.

Jack F. Gerrissen et al., "Inclusion of a 'Sharing' Feature in Telecommunication Services", September 1990, HFT '90.

John C. Tang, "Listing, Drawing, & Gesturing in Design: A Study of the Use of Shared Workspace by Design Team", April 1989.

Jakob Nielsen, "CHI '89 Trip Report", October 1989, SIGCHI Bulletin, Volume 21, No. 2.

"Drama & Personality in User Interface Design (Panel)", May 1989, CHI '89 Proceedings.

Krueger, Myron A., "Artificial Reality", 1982, pps 124–128.

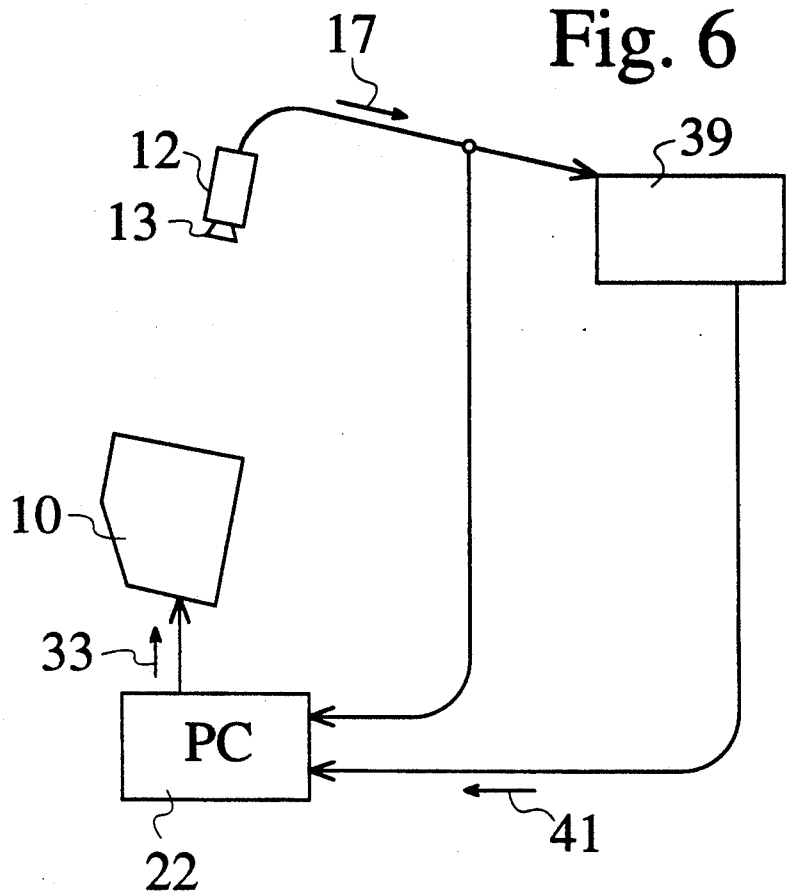
Fig. 6
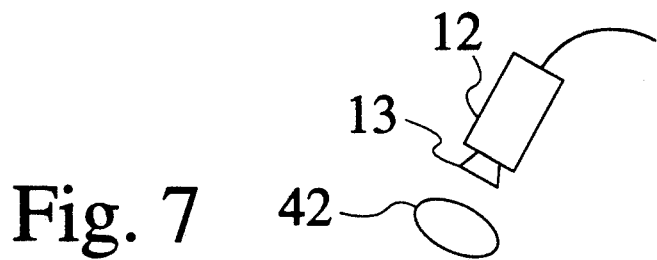
Fig. 7
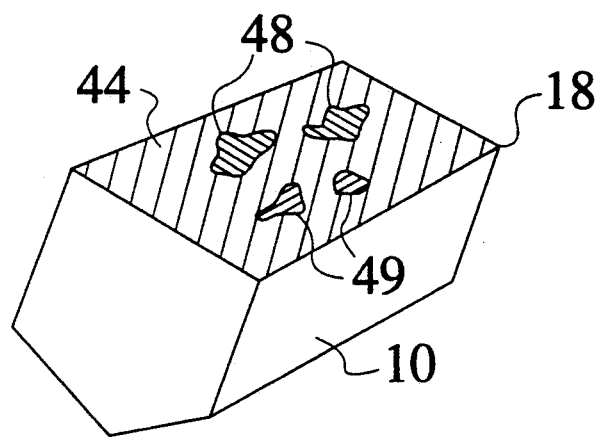

VIDEO COMPUTATIONAL SHARED DRAWING SPACE

BACKGROUND OF THE INVENTION

The present invention relates to the field of multimedia communication devices. More particularly it relates to the field of shared drawing devices that use computer and video technology.

In recent years, psychologists and others have begun to recognize that telecommunication inhibits true exchange of information in important ways. Jack Gerissen and John Daamen mention this fact in a paper entitled "Inclusion of a 'Sharing' Feature in Telecommunication Services" at the 13th International Symposium on Human Factors in Telecommunications, held in September, 1990. In this paper, the authors contrast face-to-face communications with telecommunications. They point out that many telecommunication devices lack the shared workspace which is an important feature of face-to-face communications.

Recently a study of interactions among team members during a design process was conducted. In his doctoral dissertation, "Listing, Drawing, and Gesturing in Design: a Study of the Use of Shared Workspaces by Design Teams", Xerox Corporation Report No. SSL-89-3, April, 1989, John Tang concluded that "gestures and their relationship to the workspace convey important information". Moreover, he recognized that "the nature of the access to the workspace (orientation, simultaneous access, and proximity) structures how the workspace is used".

With the advent of the computer, and improvements in telecommunication capabilities, for example communication satellites and video cameras, the opportunities for long distance collaboration in development, design and visual communication are expanding. Engineers have already developed many devices which enable improved collaboration among participants in a communication process. Two important ones will be described below.

Xerox' VideoDraw provides a video shared drawing space and can be considered a video homologue of a chalkboard or whiteboard. Each participant uses whiteboard markers to mark on a TV screen. Video cameras aimed at each TV screen transmit the marks and the accompanying hand gestures that each person makes to all the other screens on the network. A large scale version of VideoDraw, called VideoWhiteboard, has also been developed. See U.S. application Ser. No. 07/559486, filed Jul. 30, 1990, entitled "Apparatus Allowing Remote Interactive Use of a Plurality of Writing Surfaces".

Xerox' Commune provides a shared drawing space that can be considered a computational homologue of a pad of paper. In this device, each person manipulates a stylus to "draw" on a transparent digitizing tablet that is mounted over a computer display monitor. Each tablet and computer display is connected to a computer central processing unit (CPU). The CPUs are then connected together into a network. Each person sees a computer combined image of the "drawings" made by each person at each digitizing tablet on the network. Each person has a color-coded cursor that always tracks the motion of each stylus. The stylus/computer interface can be designed so that the stylus can "erase" or "draw" as desired by the person.

While each of the above devices was a considerable improvements each lacks important features for enhancing communications. VideoDraw is only a video device and has no computing capability. Thus storage of information and printing of output are difficult. Commune has computing capability but complex video function. This means that hand gestures are reduced to cursor motions. Combining the features of VideoDraw and Commune would provide a device representing a great step forward in the field of telecommunications. The enhanced capabilities of this device would satisfy a long felt need in the field of shared drawing systems.

SUMMARY OF THE INVENTION

The present invention, Video-Computational Shared Drawing Space or VideoCom, is an improvement produced by combining the features of VideoDraw and Commune. The heart of each VideoCom workstation is a display unit which has a flat computer monitor, which displays the composite image. A stylus is used to "write" on the screen. A device for detecting the position of the stylus over the composite image is affixed adjacent to the monitor. A video camera is mounted a short distance away from the display and is aimed at the screen. A light provides uniform illumination to the screen. Each workstation also includes a mechanism for preventing video feedback and a computer. A special configuration of cables is used to interconnect the display, the stylus, the position detector, the video camera and the computer. Two or more VideoCom workstations can be connected to each other via cables or over a network. In a two-station configuration, the camera from one workstation is connected to the computer of another workstation.

The device used for detecting the position of the stylus can utilize visual, as emitted by light emitting diodes (LEDs), resistive, electromagnetic or sonic signals. Alternatively, the computer, in association with the video camera, can be programmed to detect the position of the stylus. In the preferred embodiment, a transparent, electromagnetic digitizer is used to detect the stylus' position.

Any one of a number of techniques may be used to prevent video feedback. In systems comprised of a small number of workstations, colored filters may be used. Alternatively, video image processors capable of video canceling may be used. In the preferred embodiment, one polarizing filter is attached in front of the video camera lens, while another, orthogonal to the first, is placed over the screen. These polarizing filters in combination with the uniform lighting eliminate video feedback.

In the preferred embodiment of VideoCom, each participant "draws" with the stylus on the transparent digitizer. In addition the video camera mounted over each workstation captures the images of each participant's hands. The polarizing filters in combination with the uniform lighting prevent the video camera from detecting the composite image. Combining the video camera images and the "drawings" produced by the styli via a computer network allows each participant to see the "drawings" produced by him and every other participant as well as the hand motions of every other participant. The ability to see other participants' hand motions superimposed on the combined drawing activities provides a significant improvement in personal interactions. The team's ability to effectively and naturally share a drawing space is greatly enhanced.

Many alternate embodiments of VideoCom can be created by connecting other components into the computer network. Various combinations of video mixers and video buses can be utilized instead of directly connecting the video cameras to the computers with cables. Three dimensional effects can be created by employing a second video camera, adjacent to the first, in combination with a pair of shuttering spectacles at each workstation. Images of additional objects can be provided by extra cameras connected in several different ways to the network. To enhance communication between operators separated by large distances, microphones, loudspeakers, auxiliary cameras and auxiliary video displays can be provided at each workstation. Also, to facilitate communication over emerging commercial communication standards, a coder/decoder can be utilized to encode and decode the all the signals which are passed from workstation to workstation. The network can also be provided with a recording and playback facility, so that prior activities of the team can be captured and reviewed at a later time. Using existing video technology, each display in the network can be provided with an inset which can display any desired image.

Finally, large scale versions of VideoCom can be constructed. In large scale VideoCom, the display unit is replaced with a large screen and a video projector. While the projector is generally placed to the rear of this screen, the video camera can be placed on either side to create differing effects. Many of the variations that are described above for small scale VideoCom are also possible with large scale VideoCom.

An appreciation of the other aims and objectives of the present invention and a more complete and comprehensive understanding of it may be achieved by referring to the accompanying drawings and by studying the following description of a preferred embodiment.

BRIEF DESCRIPTION OF THE DRAWINGS

FIG. 6 is a schematic representation of using real time image canceling to control video feedback.

FIG. 7 is a schematic representation of using colored filters to control video feedback.

DETAILED DESCRIPTION OF THE PREFERRED EMBODIMENT

Throughout this specification reference numbers are used with and without alphabetic suffixes. When descriptions are generic, reference numbers alone are used. When descriptions must refer to many of the same item, the letter suffix "a" denotes the first, the letter suffix "b" denotes the second, and so forth.

Figure 1:
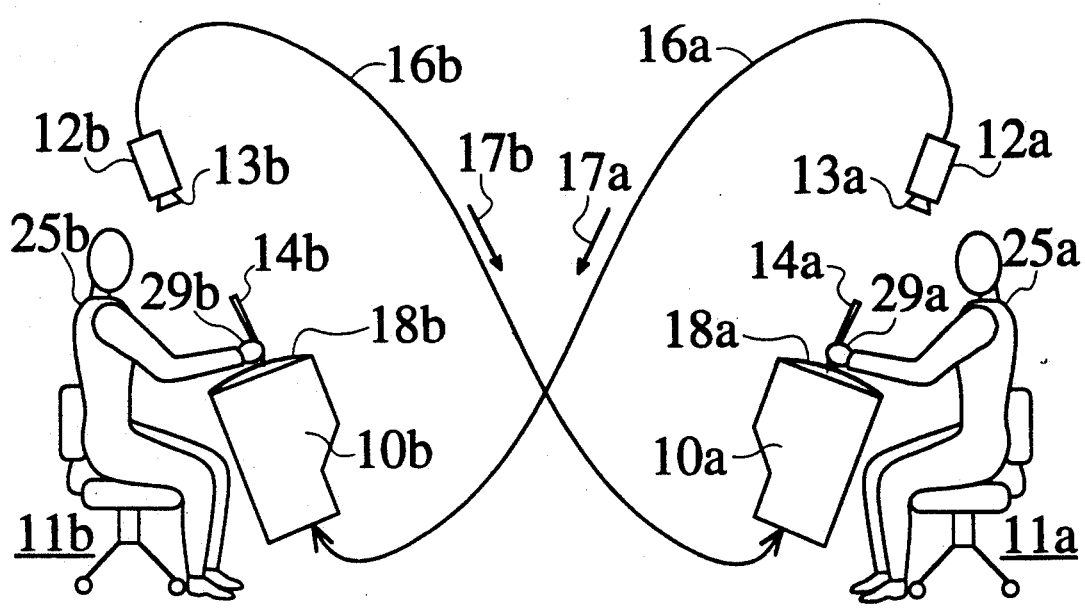
FIG. 1 is a representation of the two person VideoDraw configuration.

FIG. 1 shows a two person VideoDraw configuration. At each workstation 11 there is a video display unit 10, which has a display screen 18. A video camera 12 is mounted above each video display unit 10 and pointed at the video screen 18. The video camera 12a at the first workstation 11a is connected to the display unit 10b of the second workstation 11b via a video cable 16a. The video camera at the second workstation 11b is connected to the display unit 10a of the first workstation via another video cable 16b. Polarizing filters 15, not visible on FIG. 1, are mounted on each lens 13 and polarizing filters 19, not visible on FIG. 1, are mounted over each video screen 18. The filters 15, 19 are nearly orthogonal to each other. The screens 18 are uniformly illuminated by a light 23 (not illustrated), which is positioned so that it does not add glare or bothersome reflection. The first video camera 12a sends a signal 17a to the second video display unit 10b. The second video camera 12b sends a signal 17b to the first video display unit 10a. The lens 13a of the first video camera 12a is zoomed in on the first screen 18a. Likewise, the lens 13b of the second video camera 12b is zoomed in on the second screen 18b.

In this apparatus each collaborator or operator 25 draws on the surface of the polarizing filter 19 with dry erasable ink markers 14. Whiteboard markers work very well for this purpose. As one operator 25 draws over his video screen 18, the video camera 12 transmits an image of those marks and the accompanying hand gestures to the other screen 18. The resulting composite image 38 can be seen be the other operator 25. Each collaborator 25 can add to a sketch that appears on his screen 18. At all times a complete image of the operator's hands 29, the ink marks and, possibly, the marker 14, is visible on all screens 18. The collaborators 25 can draw, erase, and gesture over the screens 18 much as if they were sharing a pad of paper.

The polarizing filters 15, 19, in combination with the uniform lighting, are essential to control video feedback. Video feedback is a phenomenon caused by positive summation, or oscillation, of a video signal through a camera that is viewing its own output in a way that nearly fills the camera's field of view. Video feedback, being a visual phenomenon, is easier to demonstrate than describe. However, it can be thought of as the video analog of the common audio feedback or squealing which is caused by positive summation of an audio signal when the microphone is placed too near the loudspeaker in a sound amplification system. In VideoDraw, it has been found that for best operation the polarizing filters 15, 19 must be nearly orthogonal to each other. In this configuration there is actually some feedback. Allowing some feedback saturates the screen 18 and provides a white backgroung. The ambient lighting then provides a bright, uniform background to light the operator's hands 29 and the marker 14.

While FIG. 1 only shows a two person VideoDraw configuration, it would be obvious to one skilled in the art that a multi-person configuration can be constructed. It is also obvious that this apparatus can be enhanced for long distance communication by addition of audio links, that is by adding interconnected microphones and loudspeakers. Furthermore, communication among the workstations could be handled by a communication network rather than by direct cable hookup.

Figure 2:
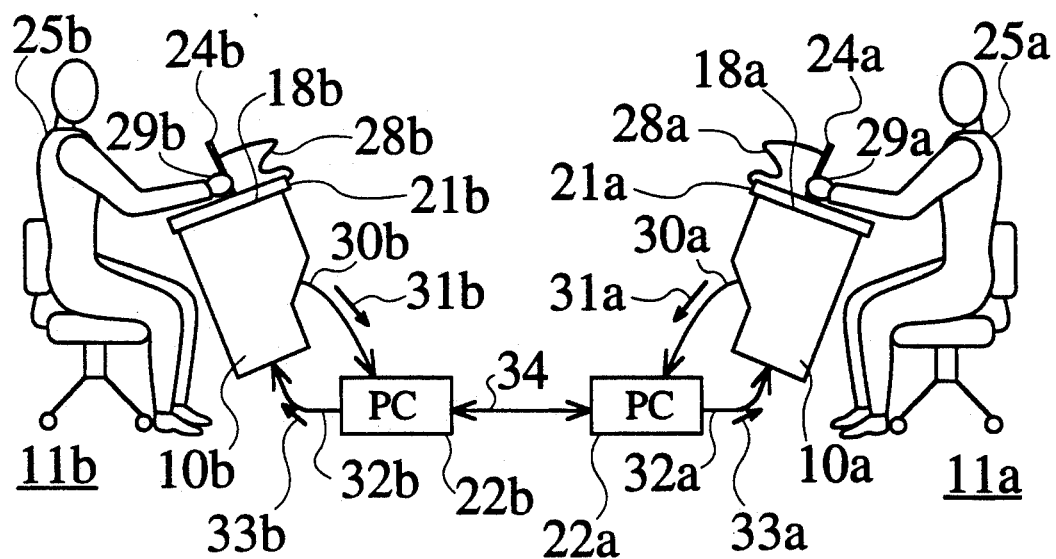
FIG. 2 is a representation of the two person Commune configuration.

FIG. 2 shows a two person Commune configuration. At each Commune workstation 11 there is a display unit 10 which has a flat computer screen 18. On top of the screen 18 there is a transparent digitizer 21. A stylus 24 is attached to the digitizer 21 via a stylus connecting cable 28. Signals 31, representing the position of the stylus 24 on the digitizer 21, are sent over the digitizer connection cable 30 to a personal computer central processing unit (CPU) 22. The CPUs 22a, 22b at each workstation 11a, 11b are interconnected via a communication cable 34. Display signals 32 are sent from each CPU 22 to each video display unit 10. The computers 22a, 22b mix the digitizer signals from each workstation 11a, 11b and present a composite image 38 of the "drawings" produced by each participant 25 with his stylus 24 on each screen 18. In an alternate embodiment of Commune, the stylus can be provided with the capability to "draw" or "erase" marks made by any or all participants 25.

While FIG. 2 only shows a two person Commune configuration, it would be obvious to one skilled in the art that a multi-person configuration can be constructed. It is also obvious that this apparatus can be enhanced for long distance communication as described above for VideoDraw.

Figure 3:
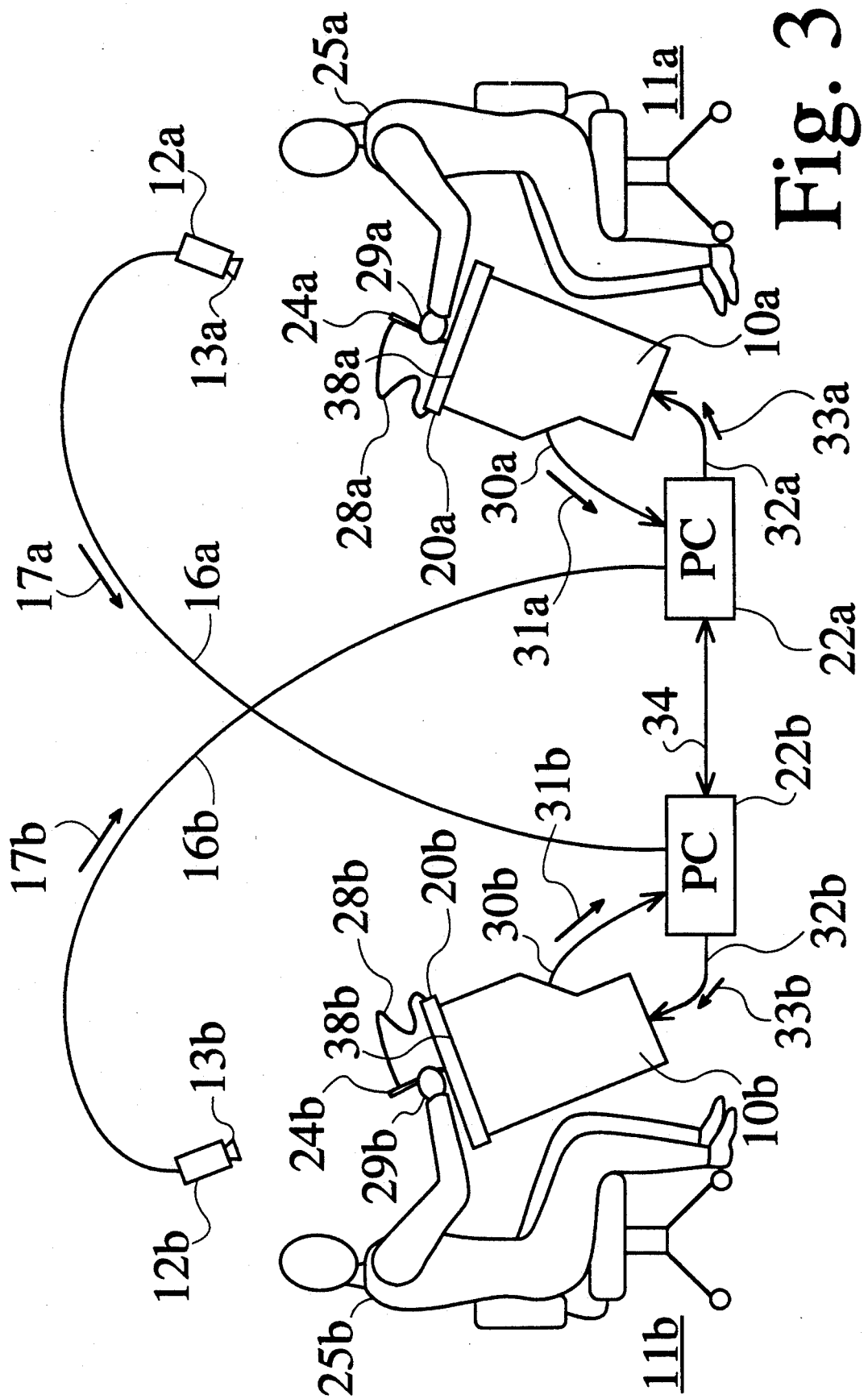
FIG. 3 is a representation of the two person video-computational shared drawing system (VideoCom).

FIG. 3 shows the basic details of a two person video-computational shared drawing system, called VideoCom. As mentioned before, this invention is a combination of VideoDraw and Commune. At each VideoCom workstation 11 there is a display unit 10, which has a flat computer display screen 18, not visible on FIG. 3. On top of the screen 18 there is a position detector 20. A stylus 24 is attached to the detector 20 via a stylus connecting cable 28. Signals 31, representing the position of the stylus 24 on the detector 20, are sent over the detector connection cable 30 to a personal computer central processing unit (CPU) 22. The CPUs 22a, 22b at each workstation 11a, 11b are interconnected via a communication cable 34. A video camera 12 is mounted above each workstation 11 and pointed at the screen 18. The video camera 12a at the first workstation 11a is connected to the CPU 22b of the second workstation 11b via a video cable 16a. The video camera 12b at the second workstation 11b is connected to the CPU 22a of the first workstation 11a via another video cable 16b. At each workstation there is a device 26, not visible on FIG. 3, to prevent video feedback.

The first video camera 12a sends a signal 17a to the second CPU 22b. The second video camera 12b sends a signal 17b to the first CPU 22a. Display signals 33 are sent from each CPU 22 to each display unit 10 via a connecting cable 32. The lens 13a of the first video camera 12a is zoomed in on first screen 18a. Likewise, the lens 13b of the second video camera 12b is zoomed in on the second screen 18b.

In VideoCom, each operator 25 draws on the surface of the position detector 20 with the stylus 24. As each operator 25 draws over the screen 18, the position detector 20 transmits signals 31 to the CPU 22 to which it is attached. At the same time the video camera 12 transmits images of the accompanying hand gestures to the CPU 22 to which it is attached. In this invention the feedback prevention device 26 prevents the video camera 12 from detecting images 38 presented on the screens 18. The CPUs 22 at each work station 11 mix the position signals 31 and the video signals 33 and present a composite image 38 to the screen 18 at each display unit. Each collaborator 25 can add to a sketch that appears on the screen 18. At all times a complete image of hands 29, styli 24 and video marks is visible on all screens 18. The collaborators 25 can draw, erase, and gesture over the screens 18 much as if they were sharing a pad of paper. The stylus can be provided with the capability to "draw" or "erase" marks made by any or all participants 25.

The CPU can be any personal computer, such as an IBM compatible personal computer based on a 286, 386, 486 or similar microprocessor, equipped with a video and computer overlay card, such as the New Media Graphics Video Window Card; a high resolution graphics card, such as the Video 7 VGA graphics card; and a serial communication card, such as a Digiboard. The video camera can be any high quality CCD camera, such as a Panasonic WDV 5000. The display can be a Zenith ZCM-1490 or equivalent.

Figure 4:
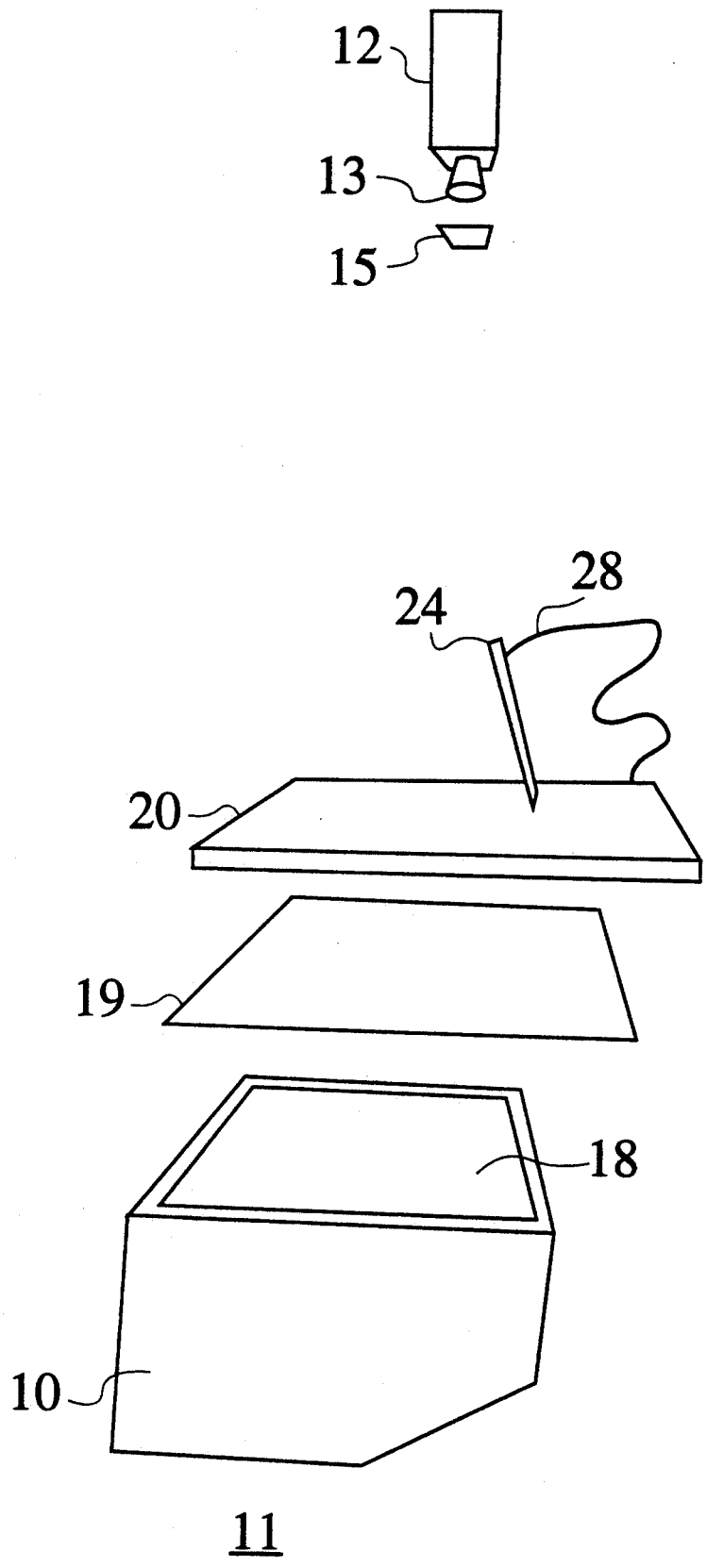
FIG. 4 shows the details in exploded fashion of the preferred method of preventing video feedback.

FIG. 4 shows the details in exploded fashion of the preferred method of preventing feedback at a VideoCom workstation. FIG. 4 shows that one polarizing filter 15 is positioned in front of the lens 13 of the video camera 12. Another polarizing filter 19 is positioned between the position detector 20 and the flat screen 18 of the display unit 10. The filters 15, 19 are orthogonal. In this configuration, no images from the screen 18 can reach the video camera 12. However, the video camera can capture images of any objects which are placed above or moved above the position detector 20. Whether the objects are in focus will depend on how close they are to the position detector 20 and the depth of focus of the lens. In most applications, the objects will be hands 29, and styli 24 moved close to the position detector 20.

Figure 5:
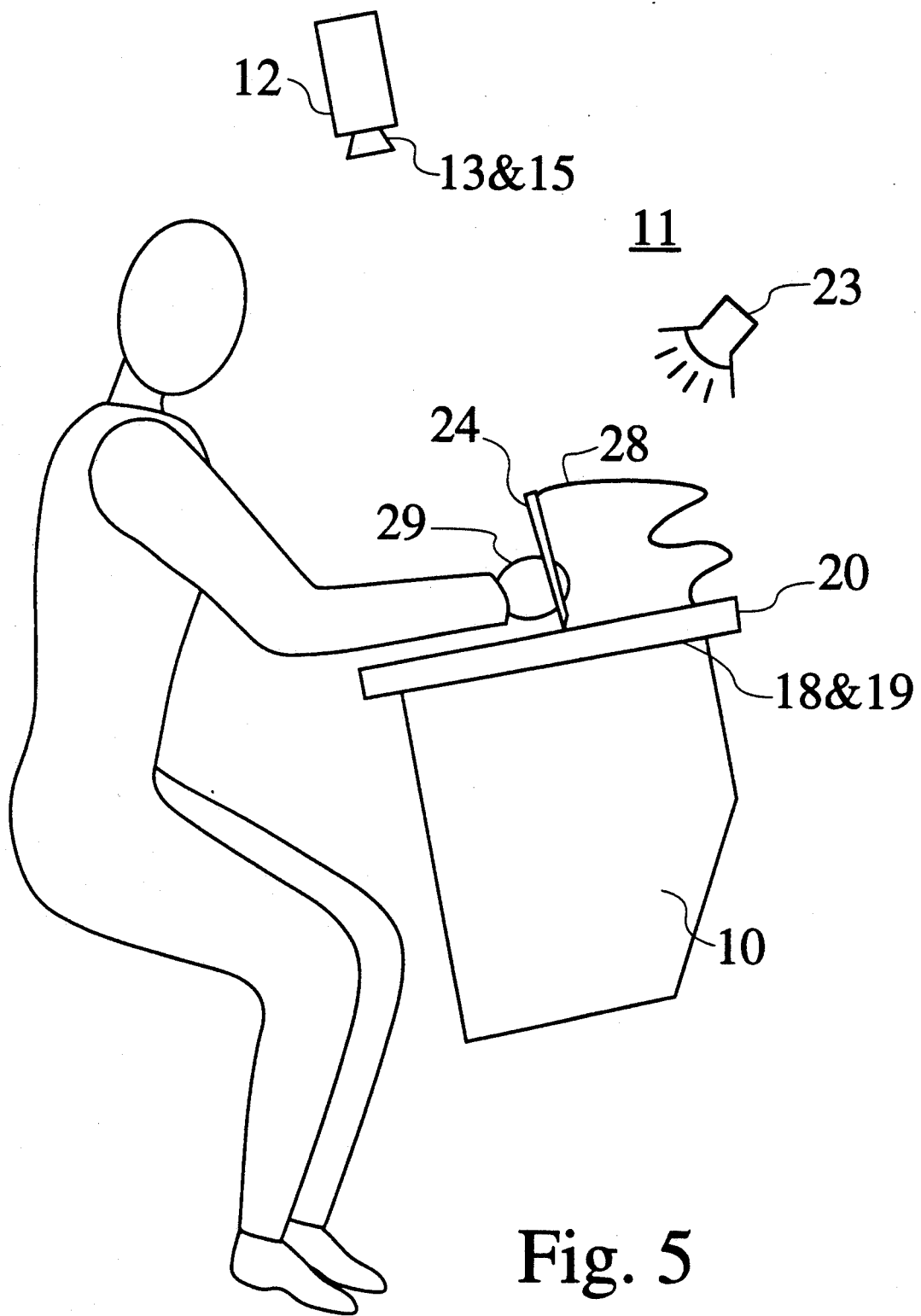
FIG. 5 shows the VideoCom lighting installation.

FIG. 5 shows the importance of proper lighting for proper operation of VideoCom. The light 23 is mounted above the display unit 10 so that it provides uniform illumination to the screen 18 while not introducing any glare or bothersome reflection. The lighting then provides a uniform ambient light to illuminate the operator's hands 29 and the stylus 24.

While crossed polarizing filters are the preferred method of preventing video feedback, other methods can be used. FIG. 6 shows how real time image canceling could be used to control video feedback. As shown on FIG. 6, the signal 17 from the camera 12 is fed to a video mixer 39, to be combined with other video signals, as well as to the CPU 22. The computer 22 then subtracts out the signal 17 from the mixer signal 41. This could be accomplished by analog or digital signal processing. Thus the video signal 33 going to the display unit 10 is essentially devoid of video feedback.

FIG. 7 shows how color separation can be used to control video feedback. The background color 44 of the screen 18 and the color 49 of objects presented on the screen 18 is selected so that a colored filter 42 placed in front of the lens 13 would block images 38, not visible on the Figure, displayed on the screen 18 in these colors 44, 49 from being detected by the camera 12. However, objects of another color 48 placed on or moved above the screen 18 are still be visible to the camera 12. Thus again feedback is substantially eliminated.

Figure 8A:
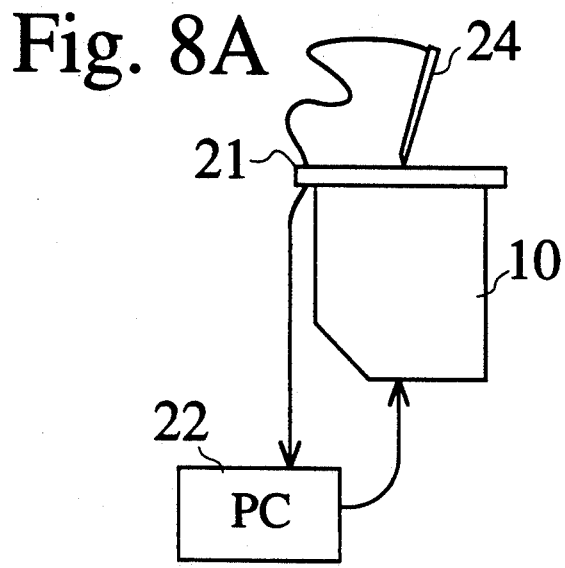
FIG. 8 illustrates various ways of sensing the position of the stylus.
Figure 8B:
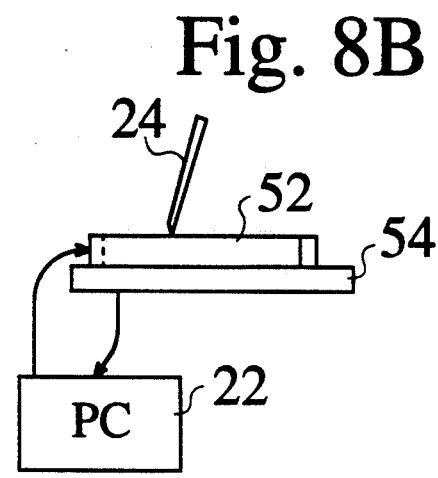
Figure 8C:
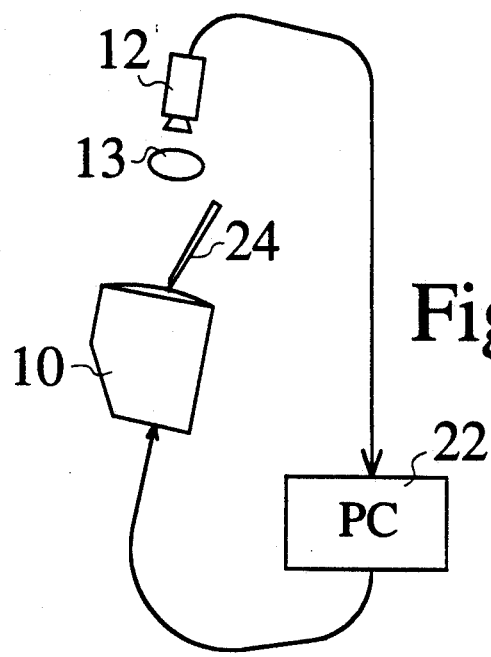
Figure 8D:
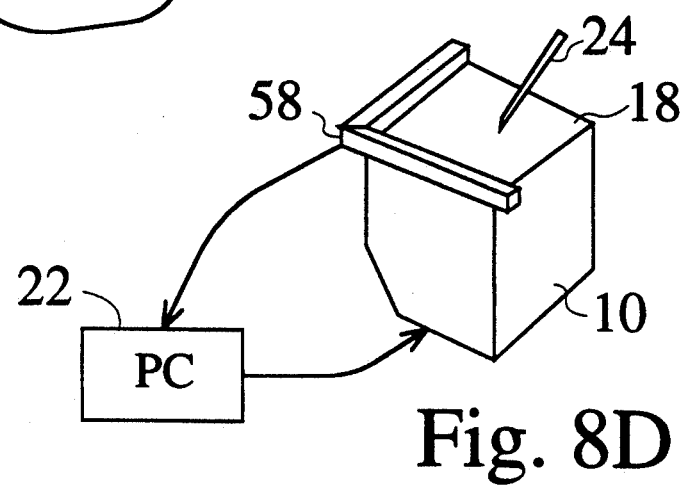

There are many ways of detecting the position of the stylus. FIG. 8 illustrates various methods. FIG. 8A illustrates the preferred device, a transparent digitizer 21. The digitizer 21 has embedded detectors which enable it to continuously detect the location, projected onto the two-dimensional digitizing surface, of the stylus 24. In addition the stylus 24 has a tip switch, not visible, which detects whether or not the stylus is touching the digitizer 21. The transparent digitizer 21 can be a Scriptel RDT-1212 or equivalent. FIG. 8B illustrates an alternate stylus sensing device 54. In this alternate embodiment, the flat screen is replaced with a flat active display 52. The stylus 24 can be cordless. This display 52 is placed over the stylus position detector 54. The detector 54 can then detect the position of the stylus through the display 52. FIG. 8C shows that the camera 12 in combination with the CPU 22 can be programmed to detect the position of the stylus 24. In this case the stylus 24 would preferably be pen that emits some visible signal, for example a light pen. FIG. 8D illustrates another device 58 which is placed on two sides of the screen 18 to detect the position of the stylus 24 in two dimensions. This device 58 can use light from an LED or sonic detection to sense the position of the stylus 24. Many devices exist, which are not illustrated, which can sense the position of the stylus 24 in two dimensions using the force applied to the stylus 24.

Figure 9:
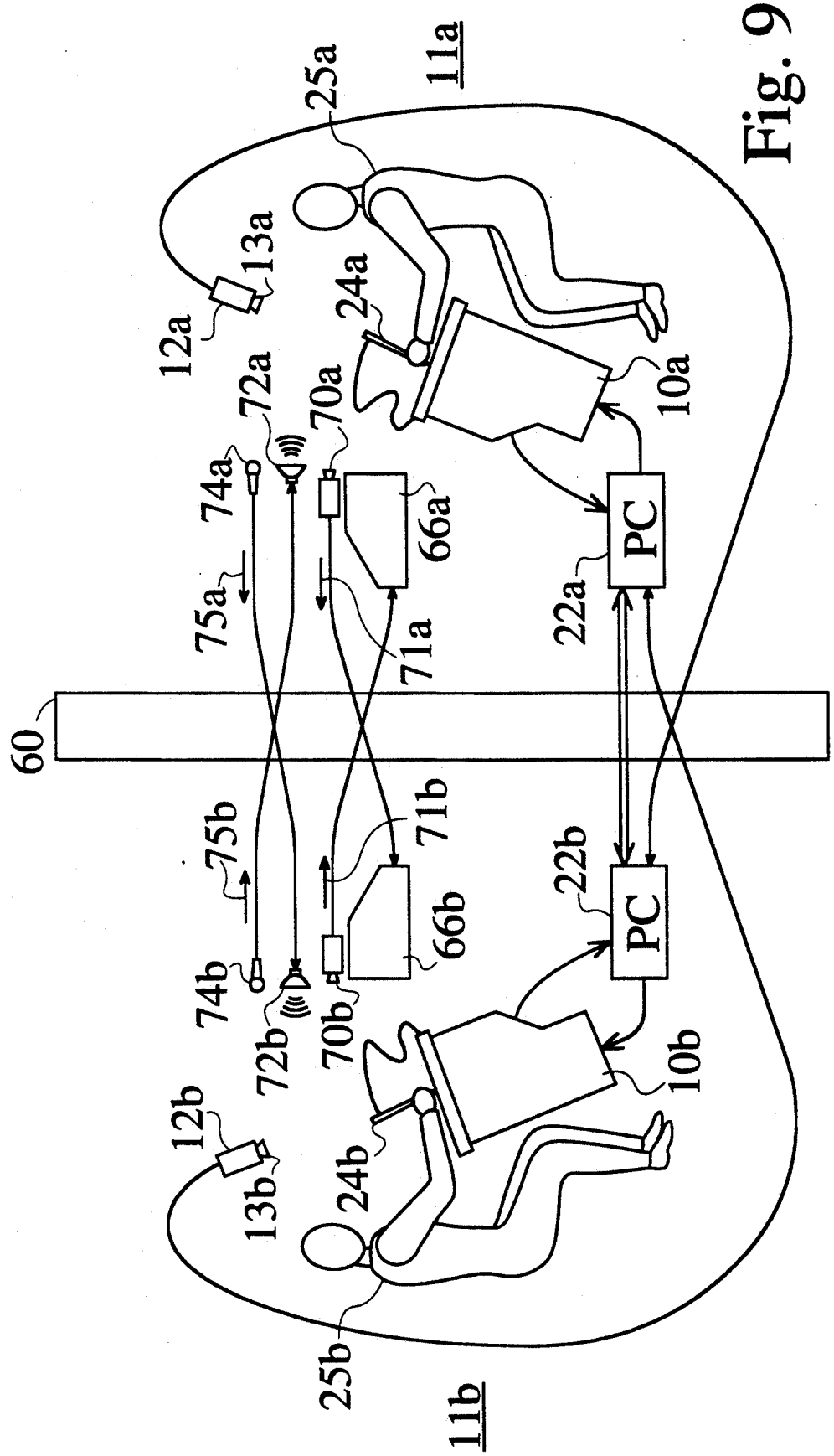
FIG. 9 shows how VideoCom work stations at remote locations can be augmented with video and audio links.

Many variations of VideoCom are possible. FIG. 9 shows how VideoCom work stations at remote locations can be augmented with video and audio links. At each workstation 11 there is an auxiliary video display 66, an auxiliary loudspeaker 72 and an auxiliary microphone 74. These are set up and interconnect so that each operator 25 can see and talk to the other.

Figure 10:
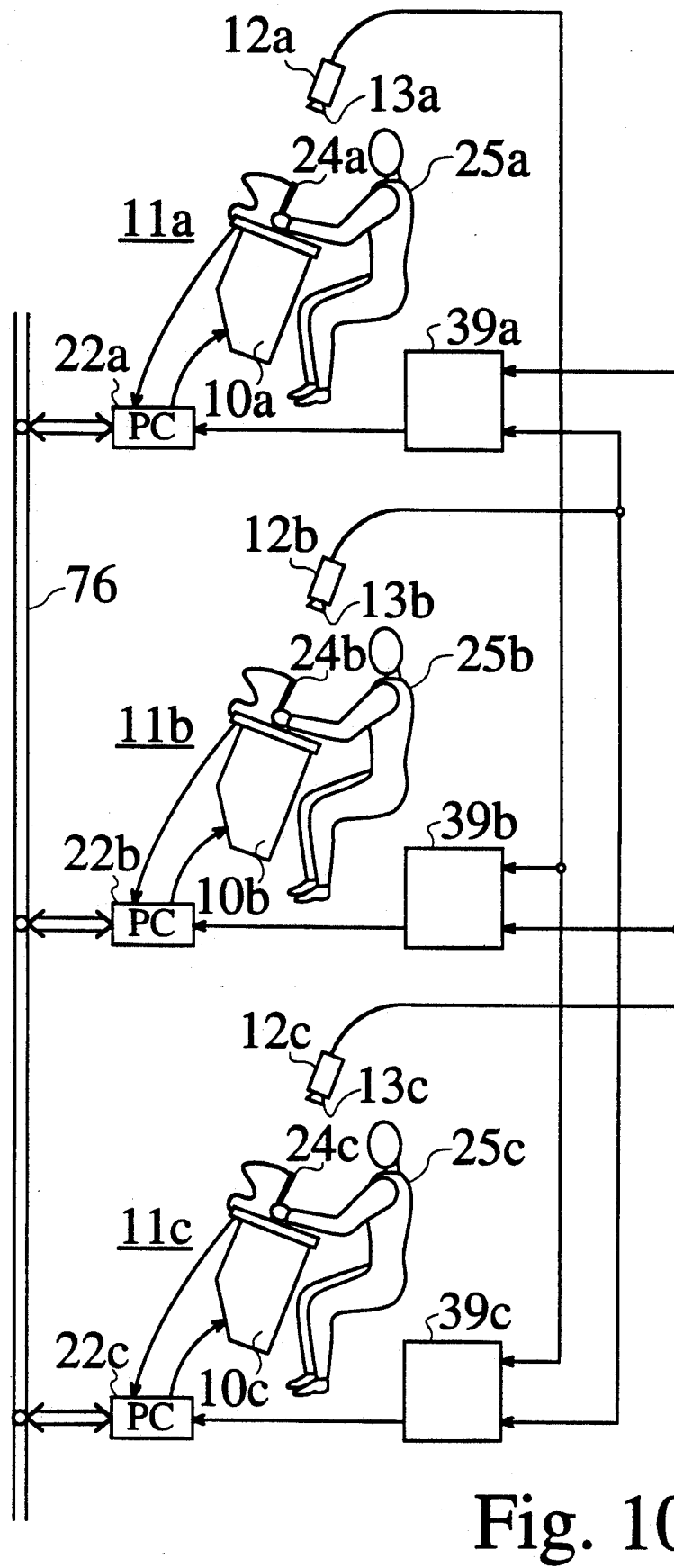
FIG. 10 shows a three person VideoCom connection scheme using three 2-way video mixers.

Moreover, more than two workstations 11 can be connected together to form a network thus enabling many operators 25 to collaborate on a project. FIG. 10 shows one way in which multiple workstations 11 can be interconnected. For clarity the cable connections are not numbered in this figure. In this variation, a 2-way video mixer 39 is added to the equipment at each work station. The video camera 12 at one work station is connected to the mixers 39 at each of the other workstations. The mixers 39 mix the video signals and present them to the computers 22 for processing and presentation to the display units 10. The workstations 11 and the CPUs 22 are connected by a network 76. Three workstations 11 are shown in FIG. 10. Persons knowledgeable in the art will recognize that it is technically possible to connect many more than three workstations 11 together in this fashion.

Figure 11:
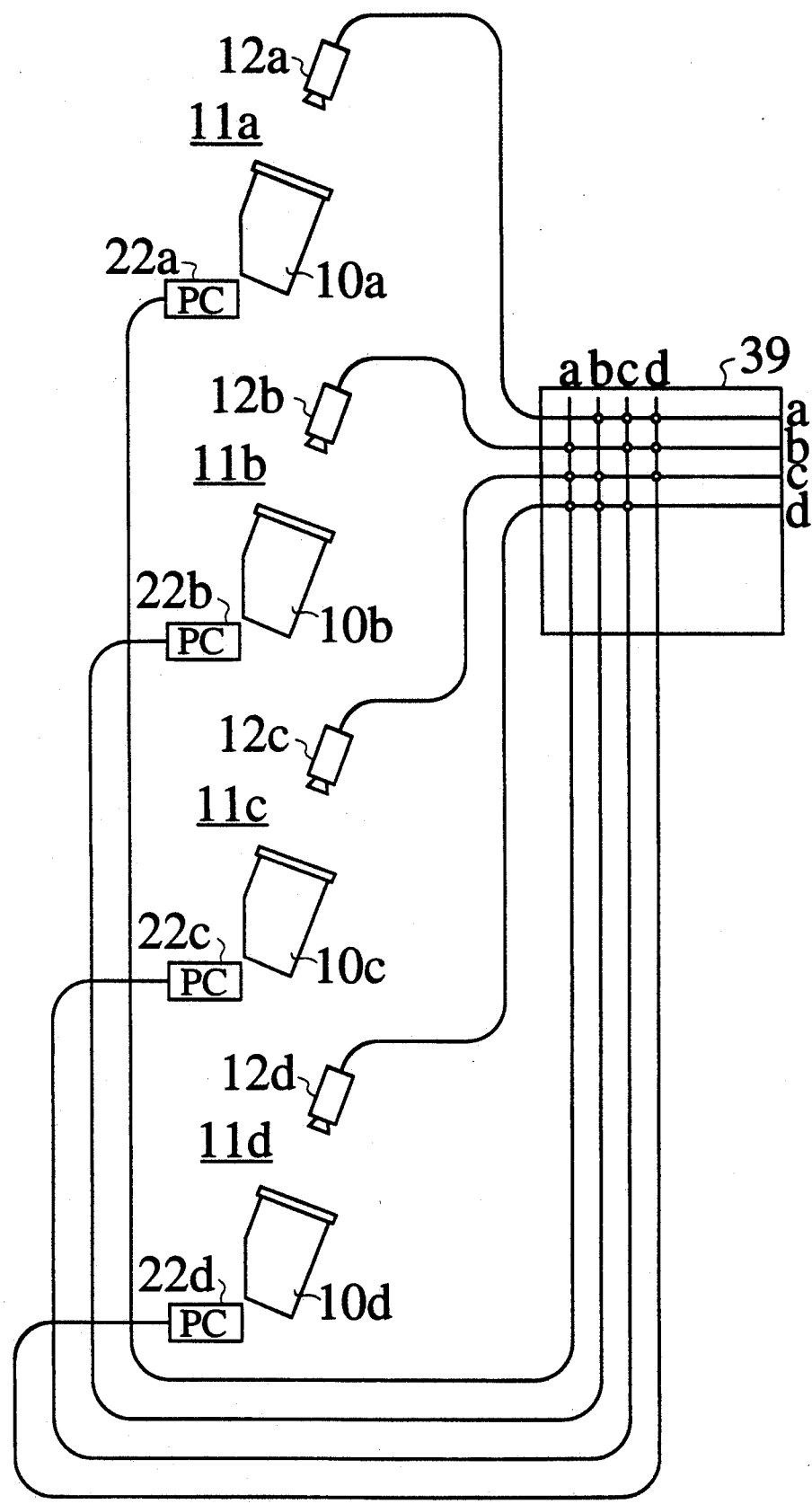
FIG. 11 shows a multi-person VideoCom connection scheme using one n-way video mixer to make the connections.

FIG. 11 shows another way of connecting together multiple workstations 11 into a network. In this variation, the video cameras 12 are connected to a single n x n-way video mixer 39. However, connections are made at this one mixer 39 so that the camera 12 at one workstation 11 is connected to the CPUs 22 at each of the other workstations. The interconnections are shown schematically on the figure by a letter matrix applied to the representation of the mixer 39. The CPUs 22 are connected via a network 76, which for clarity is not shown. Again it is easy to see that, while four workstations are shown on the figure, the network can be expanded to many more workstations in this manner.

Figure 12:
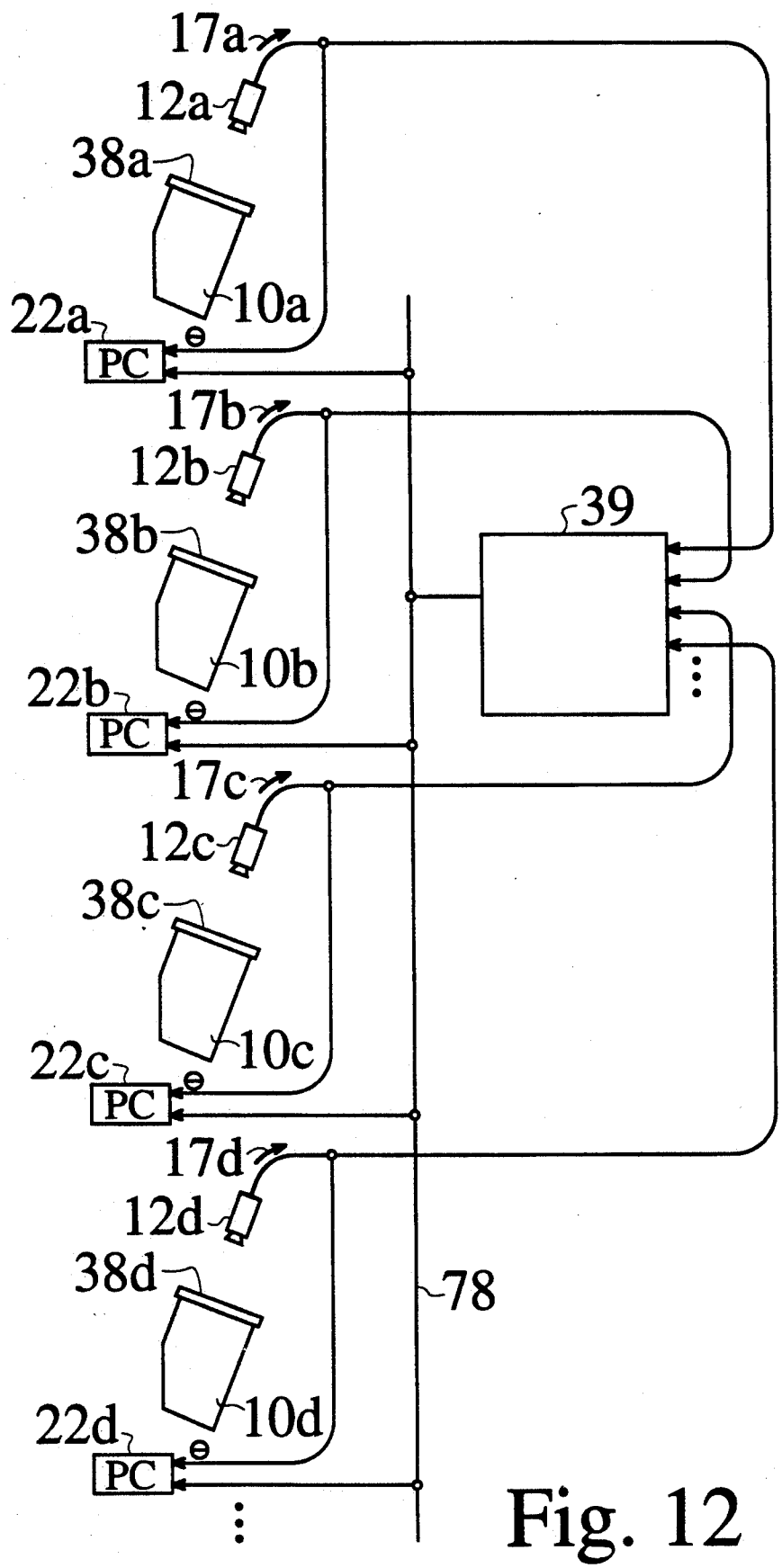
FIG. 12 show a multi-person VideoCom connection scheme using video canceling combined with one n-way video mixer and a video bus to make the connections.

FIG. 12 shows a third way of forming a network. In this variation, again the cameras 12 are connected to a single n-way video mixer 39. The output from the mixer is output to a video bus 78 to which each CPU 22 is conected. The video camera 12 at each workstation is also connected to the CPU 22 at each workstation. Then the video signal 17 produced at each workstation 11 is subtracted from the composite image 38 at each display unit 10 using video canceling techniques. For clarity, the computer network 76, connecting the CPUs 22 is not shown. Again it is easy to see that, while four workstations are shown on the figure, the network can be expanded to many more workstations in this manner.

Figure 13:
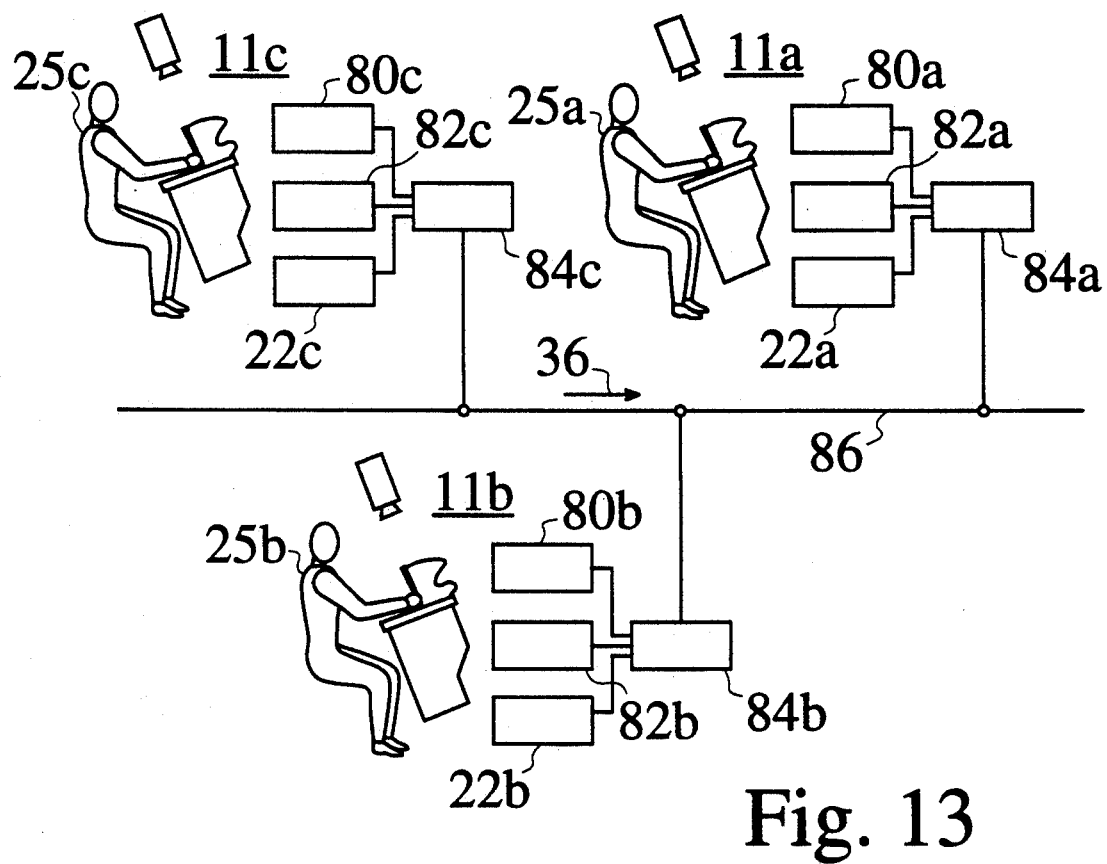
FIG. 13 is a block diagram showing connection of multiple units using a coder/decoder unit and a communication bus.

A fourth way of forming a network is shown schematically in FIG. 13. In this variation, all the signals, video, audio and computer are fed to a coder/decoder unit (CODEX) 84 from an audio interface 80, a video interface 82 and the CPU 22. The CODEX 84 compresses the audio, video and computer signals presented to it at one workstation 11 and feeds them to the communication network 86. It also decompresses the combined signal 36 on the network 86 from all the other workstations 11 on the network and feeds audio, video and computer signals to its workstation 11. The network 86 may be a commercial communication standard network, a direct satellite link or, if 9600 baud modems are used, a telephone line.

Figure 14A:
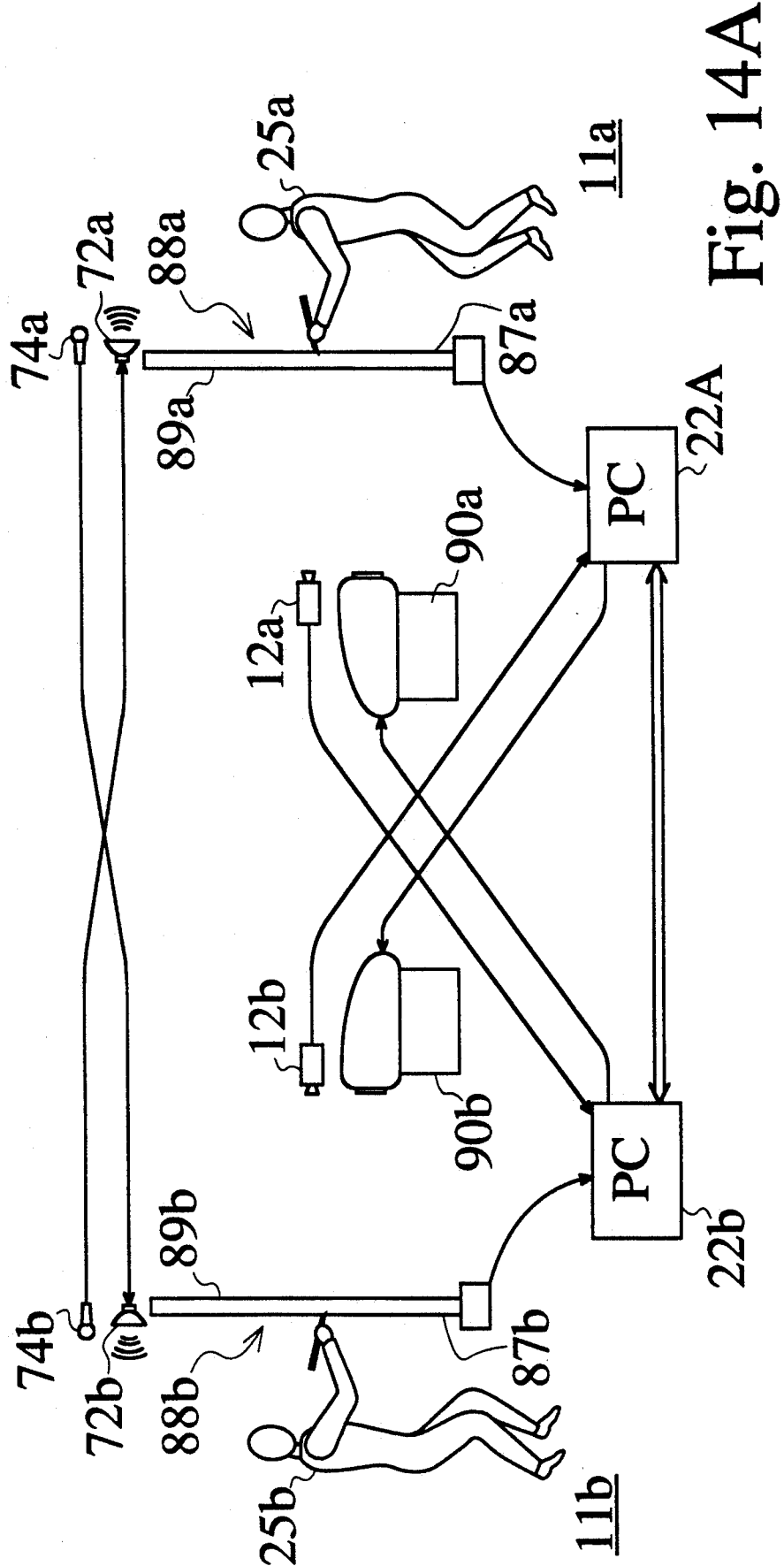
FIG. 14 shows several version of a large scale variation of VideoCom.
Figure 14B:
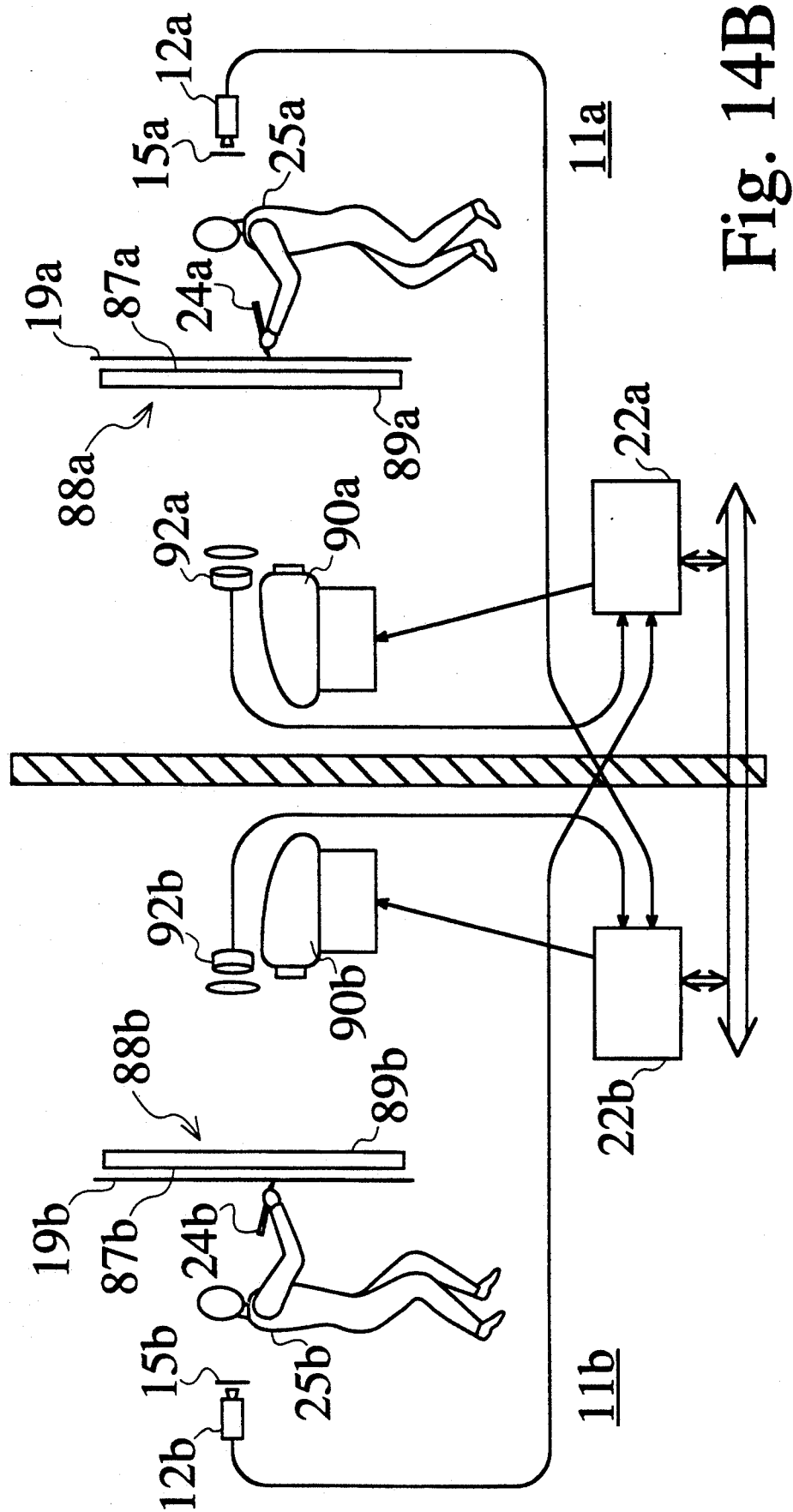

Large scale versions of VideoCom can be constructed. FIG. 14 shows several large scale versions of VideoCom. In large scale VideoCom the display unit 10 at each workstation 11 is replaced by a video projector 90 and a large screen 88. The large screen 88 is illuminated from the rear 89 by the projector 90. The features and operation of large scale VideoCom are otherwise the same as small scale VideoCom except that each operator 25 stands in front 87 of the screen 88 to collaborate with others on the drawing surface. Preferably, large scale versions of VideoCom are equipped with auxiliary microphones 74 and loudspeakers 72 to facilitate communication between operators 25. The camera 12, can be at the rear 89 of the screen 88 as shown on FIG. 14A or at the front 87 of the screen 88 as shown on FIG. 14B. When the camera 12 is placed to the rear 89 of the screen 88, one collaborator 25a sees a shadow 94 of the other collaborator 25b. When the camera 12 is placed in front 87 of the screen 88, each collaborator 25 has the impression of "looking over the shoulder" of the other collaborator 25.

Figure 15A:
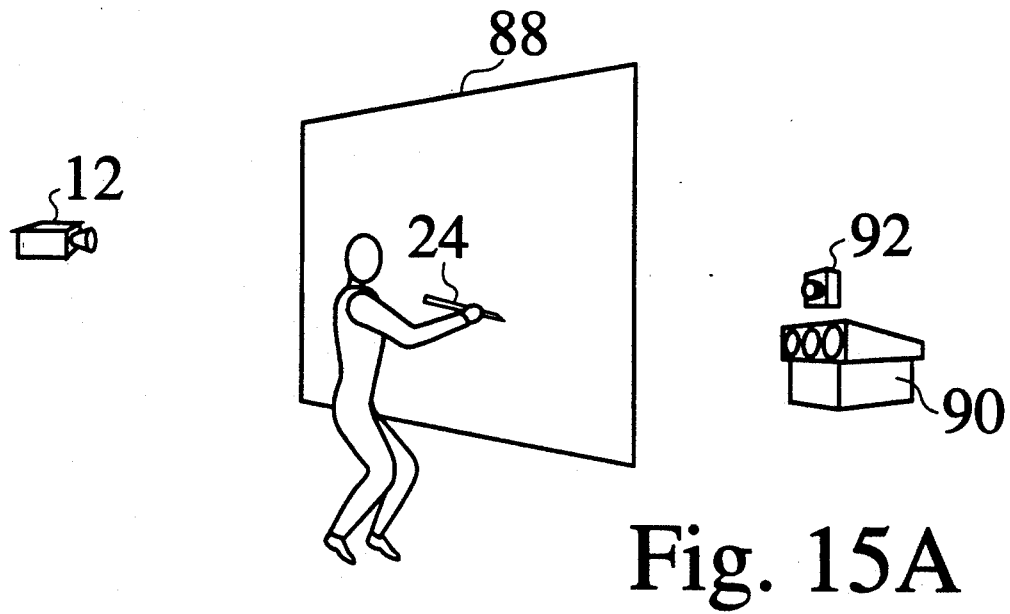
FIG. 15 shows various ways for detecting the location of the stylus in the large scale versions of VideoCom.
Figure 15B:
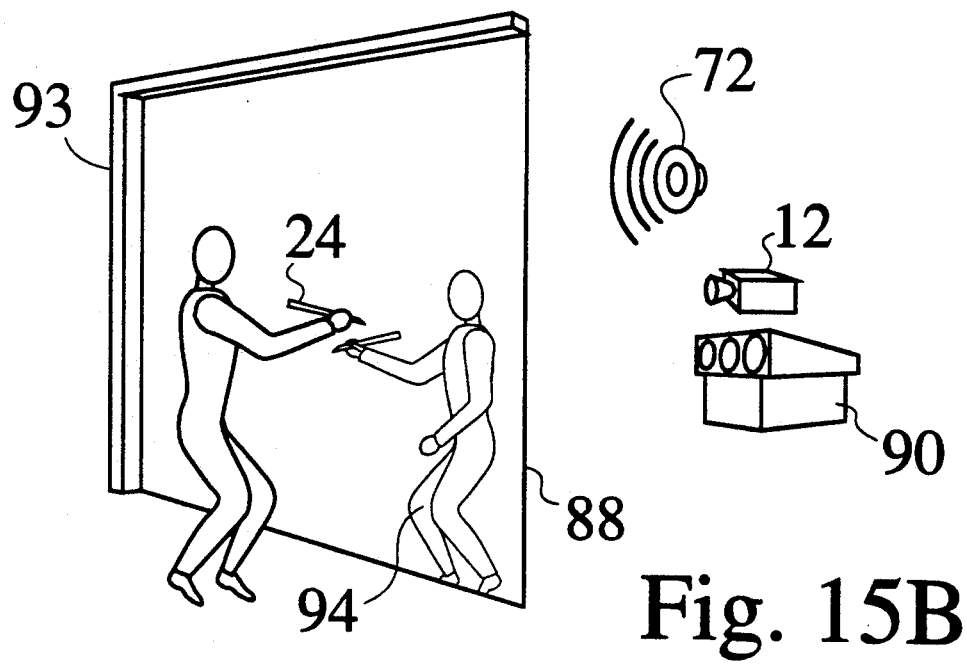

FIG. 15 shows various methods for detecting the location of the stylus 24 in the large scale variations of VideoCom. FIG. 15A shows use of an infrared sensor 93 while FIG. 15B shows use of a large scale x-y sensing apparatus 93. The large scale sensor 92 could operate by sonic or LED detection. Other methods available but not illustrated could take advantage of image processing techniques or sensing the ultrasonic vibrations given off as the stylus 24 is moved over the screen 88.

Large scale versions of VideoCom can be connected into computer and video networks by the methods shown in FIGS. 10 through 13.

Figure 16:
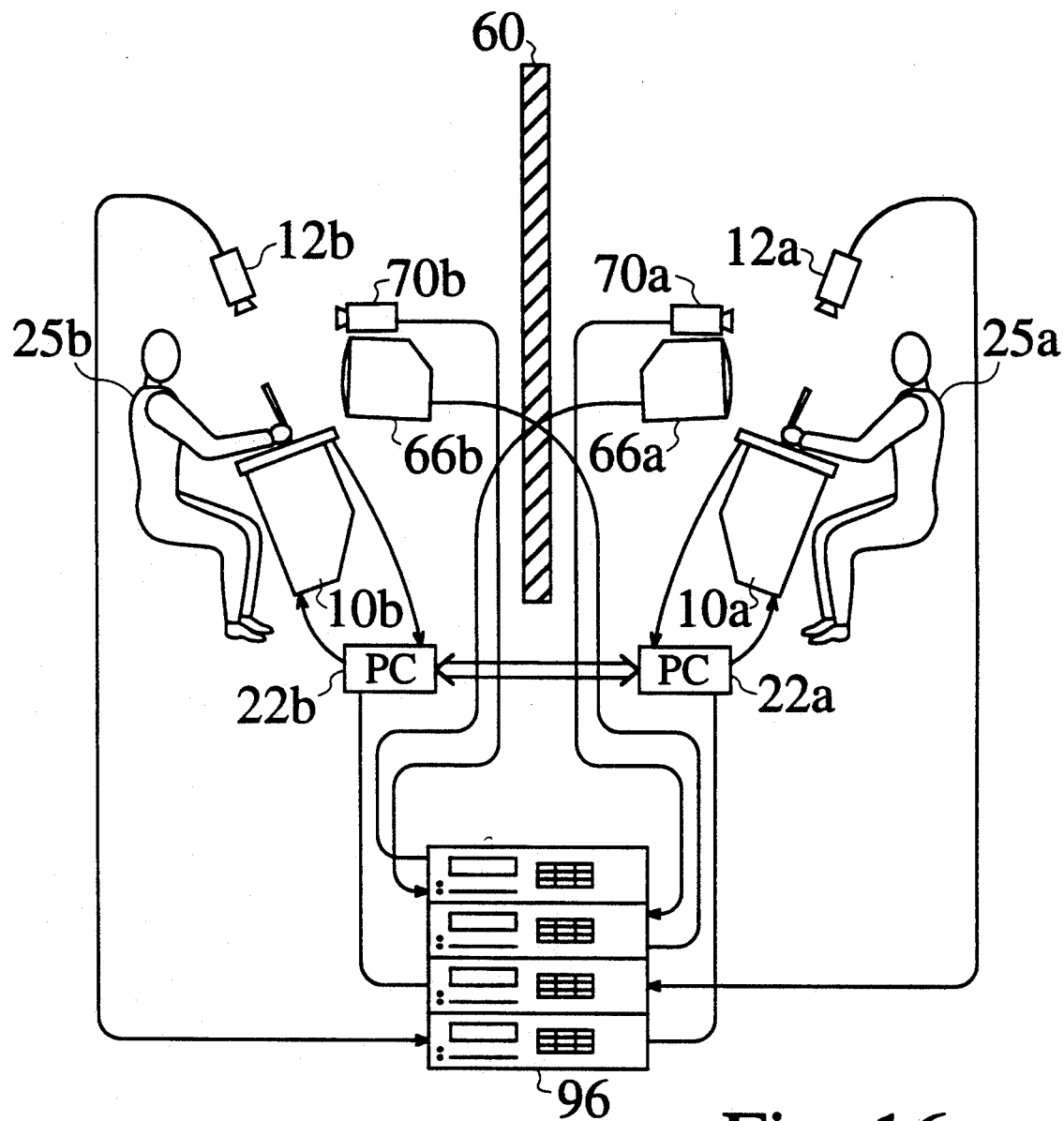
FIG. 16 shows a variation of VideoCom equipped with a recording and playback facility.

FIG. 16 shows a variation of VideoCom equipped with a recording and playback facility 96. This allows the operators 25 to record and playback any prior working sessions, including their activity, recorded in video and conversations, recorded in audio.

Figure 17:
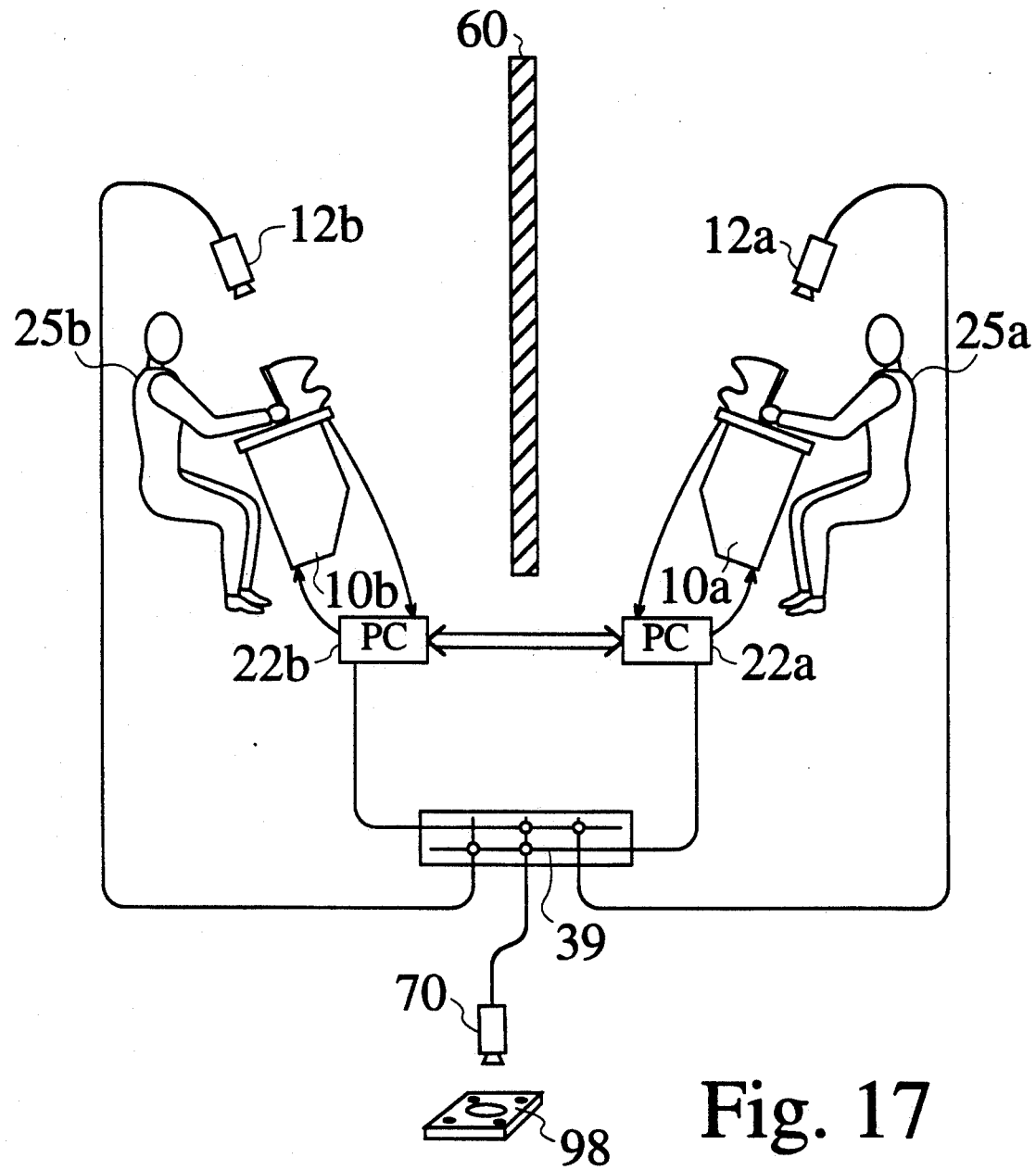
FIG. 17 shows a variation of VideoCom equipped with a facility for looking at an auxiliary object with an auxiliary camera.

FIG. 17 shows a variation of VideoCom equipped with a facility for looking at an auxiliary object 98 with an auxiliary camera 70. The auxiliary camera 70 is multiplexed with the other video cameras 12 and connected to the CPUs 22 by means of a video switcher 39. This allows the operators 25 to view any desired object 98 at a remote locations.

Figure 18:
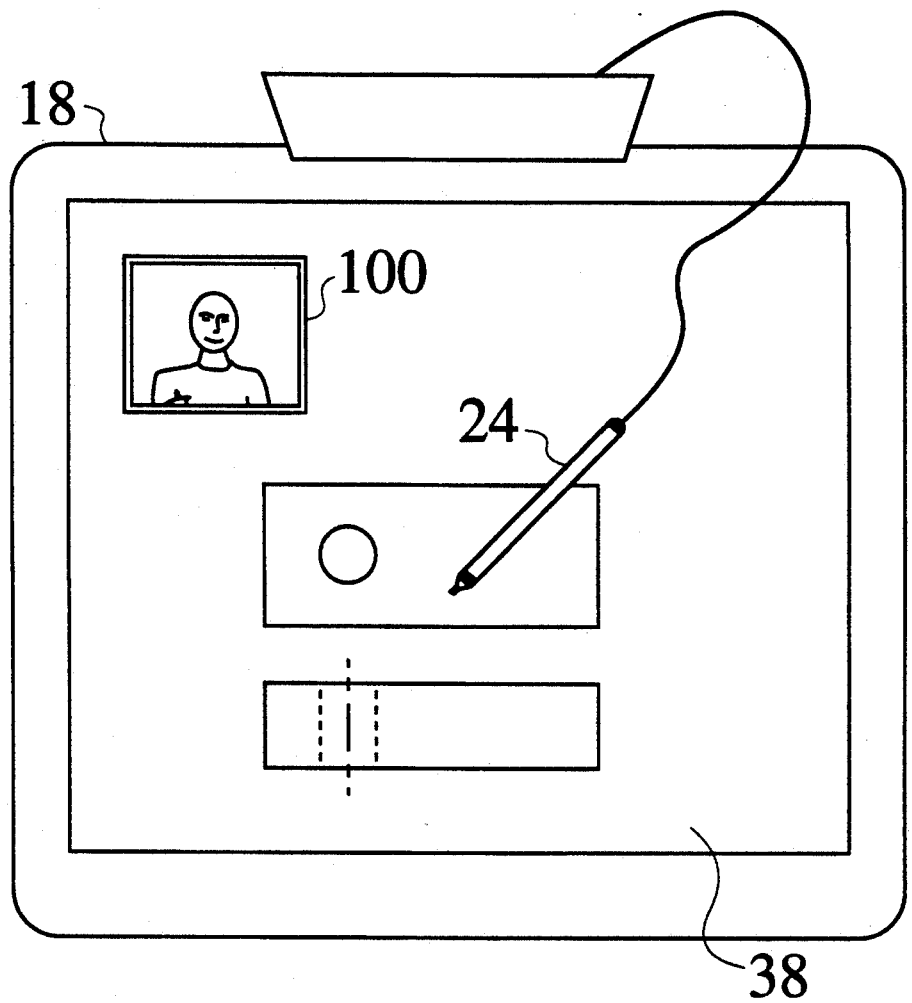
FIG. 18 shows that VideoCom can also be equipped with an inset capability.

FIG. 18 shows that VideoCom can also be equipped with an inset capability using standard video inset techniques. This allows insertion of any desired inset 100 into the composite display 38.

Figure 19:
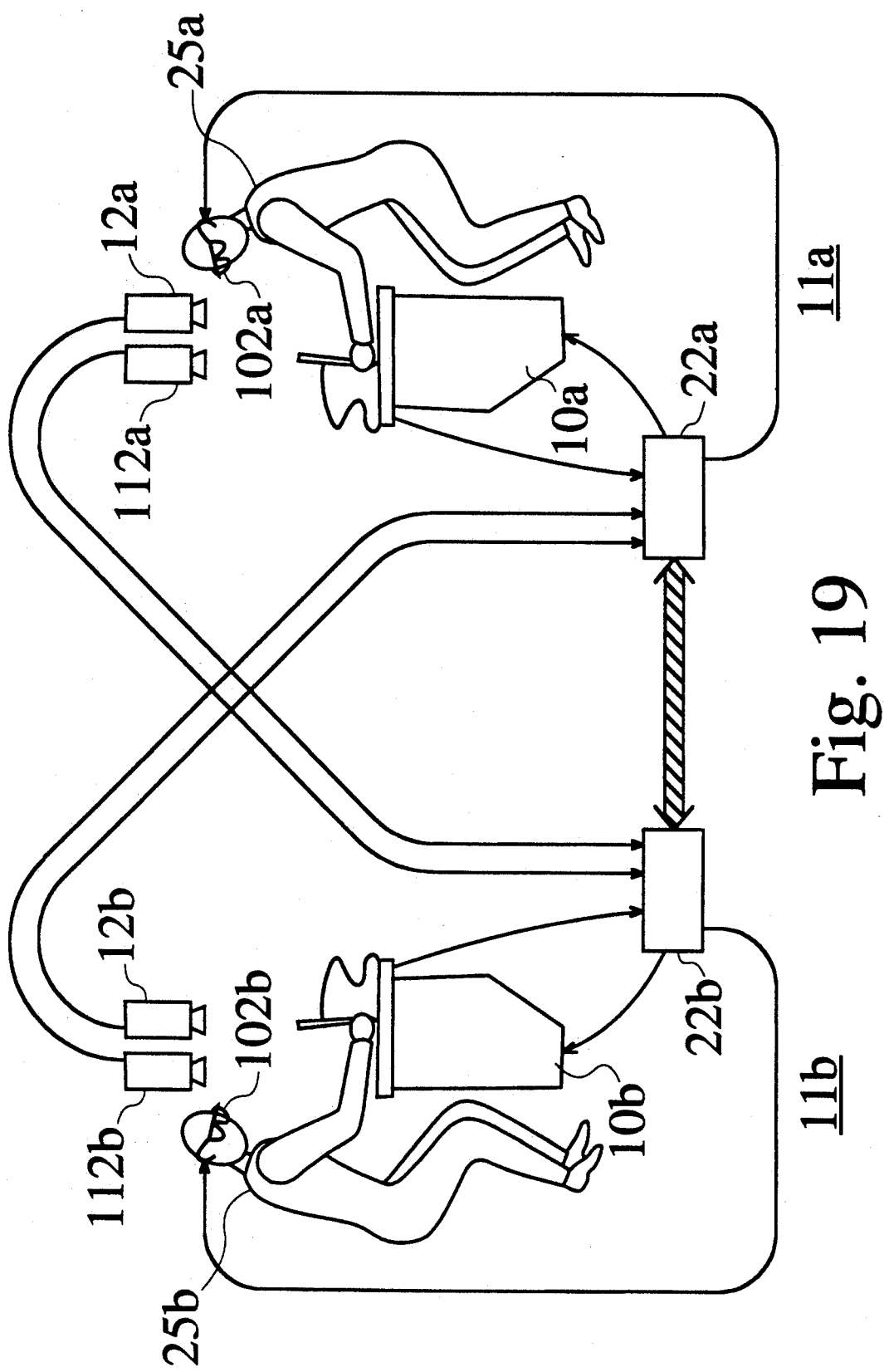
FIG. 19 illustrates how VideoCom can be configured to present three-dimensional images.

FIG. 19 illustrates how VideoCom can be configured to present three-dimensional images. In this variation a second camera 112 is placed along side the first camera 12 at each workstation 11 and connected to the CPU 22. The separation between the cameras 12 and 112 is adjusted to that required to produce stereoscopic images. Each operator wears a pair of shuttering spectacles 102. The computer derives stylus position signals from the position detectors 20 and combines them with the appropriate left and right video signals from the video cameras 12, 112. It then synchronizes the operation of the shuttering spectacles so that left and right images are presented to the operator's 25 left and right eyes in rapid succession. The operator 25 then sees three dimensional images.

Other methods available to create three dimensional images that are available but not illustrated are use of colored images and colored spectacles or lenticular screens to achieve separation of the left and right images.

This invention, VideoCom will work with any type of video format: for example PAL or HDTV. It will also work with any type of display technology including CRTs, flat panel displays, LCD displays and plasma displays. VideoCom is a homologue of a pad of paper or a whiteboard or chalkboard. VideoCom is better than reality because multiple collaborators can interact in the same workspace at the same time.

Many different variations of VideoCom have been described in detail above. Although the present invention has been described in detail with reference to particular embodiments, persons possessing ordinary skill in the art to which this invention pertains will appreciate that various other modifications and enhancements may be made without departing from the spirit and scope of the claims that follow.

| LIST OF REFERENCE NUMERALS | |
|---|---|
| FIG. 1 | |
| 10 a, b | Video display unit |
| 11 a, b | Workstation |
| 12 a, b | Video camera |
| 14 a, b | Marker |
| 15 a, b* | Camera mounted polarizing filter |
| 16 a, b | Video connection cable |
| 17 a, b | Video signal |
| 18 a, b | Video screen |
| 19 a, b* | Display unit mounted polarizing filter |
| 25 a, b | Operator |
| 23 a, b* | Light |

| LIST OF REFERENCE NUMERALS —continued | |
|---|---|
| 29 a, b | Operator's hands |
| 37 a, b* | Video image |
| *not visible | |
| FIG. 2 | |
| 10 a, b | Display unit |
| 11 a, b | Workstation |
| 18 a, b | Flat computer display screen |
| 21 a, b | Transparent digitizer |
| 22 a, b | Personal computer central processing unit (CPU) |
| 24 a, b | Stylus |
| 25 a, b | Operator |
| 28 a, b | Stylus connection cable |
| 29 a, b | Operator's hands |
| 30 a, b | Digitizer to CPU connection cable |
| 31 a, b | Digitizer signal |
| 32 a, b | CPU to display connection cable |
| 33 a, b | Display signal |
| 34 | CPU to CPU communication cable |
| 38 a, b* | Composite image |
| *not visible | |
| FIG. 3 | |
| 10 a, b | Display unit |
| 11 a, b | Workstation |
| 12 a, b | Video camera |
| 13 a, b | Lens |
| 16 a, b | Camera to CPU connection cable |
| 17 a, b | Video signal |
| 18 a, b* | Flat computer display screen |
| 20 a, b | Stylus position detector |
| 22 a, b | Personal computer central processing unit (CPU) |
| 24 a, b | Stylus |
| 25 a, b | Operator |
| 26 a, b* | Image filtering device |
| 28 a, b | Stylus connection cable |
| 29 a, b | Operator's hands |
| 30 a, b | Detector to CPU connection cable |
| 31 a, b | Position detector signal |
| 32 a, b | CPU to video connection cable |
| 33 a, b | Display signal |
| 34 | CPU to CPU communication cable |
| 38 a, b | Composite image |
| *not visible | |
| FIG. 4 | |
| 10 | Display unit |
| 11 | Workstation |
| 12 | Video camera |
| 13 | Lens |
| 15 | Camera mounted polarizing filter |
| 18 | Display screen |
| 19 | Display unit mounted polarizing filter |
| 20 | Stylus position detector |
| 24 | Stylus |
| 28 | Stylus connection cable |
| FIG. 5 | |
| 10 | Display unit |
| 11 | Workstation |
| 12 | Video camera |
| 13 | Lens |
| 15 | Camera mounted polarizing filter |
| 19 | Display mounted polarizing filter |
| 21 | Transparent digitizer |
| 23 | Light |
| 24 | Stylus |
| 29 | Operator's hands |
| 28 | Stylus connection cable |
| FIG. 6 | |
| 10 | Display unit |
| 12 | Video camera |
| 13 | Lens |
| 17 | Video signal |
| 22 | Personal computer central processing unit (CPU) |
| 33 | Display signal |
| 39 | Video mixer |
| 41 | Mixer signal |
| FIG. 7 | |
| 10 | Display unit |
| 12 | Video camera |
| 13 | Lens |
| 18 | Screen |
| 38* | Composite image |

LIST OF REFERENCE NUMERALS

| | |
|---|---|
| 42 | Filter capable of blocking color A and C |
| 44 | Color A background |
| 48 | Color B objects |
| 49 | Color C objects |
| *not visible | |
| FIG. 8 | |
| 10 | Display unit |
| 12 | Video camera |
| 13 | Lens |
| 21 | Transparent digitizer |
| 22 | Personal computer central processing unit (CPU) |
| 24 | Stylus |
| 27* | Tip switch |
| 52 | Flat active display |
| 54 | Stylus x-y sensing apparatus |
| 58 | Sonic, stylus x-y sensing apparatus |
| FIG. 9 | |
| 10 a, b | Display unit |
| 11 a, b | Workstation |
| 12 a, b | Video camera |
| 13 a, b | Lens |
| 22 a, b | Personal computer central processing unit (CPU) |
| 24 a, b | Stylus |
| 25 a, b | Operator |
| 60 | Wall(s) |
| 66 a, b | Auxiliary video display |
| 70 a, b | Auxiliary video camera |
| 71 a, b | Auxiliary video signal |
| 72 a, b | Auxiliary loudspeaker |
| 74 a, b | Auxiliary microphone |
| 75 a, b | Audio signal |
| FIG. 10 | |
| 10 a, b, c | Display unit |
| 11 a, b, c | Workstation |
| 12 a, b, c | Video camera |
| 13 a, b, c | Lens |
| 22 a, b, c | Personal computer central processing unit (CPU) |
| 24 a, b, c | Stylus |
| 39 a, b, c | Video mixer |
| 25 a, b, c | Operator |
| 76 | Computer network |
| FIG. 11 | |
| 10 a, b, c, d | Display unit |
| 11 a, b, c, d | Workstation |
| 12 a, b, c, d | Video camera |
| 22 a, b, c, d | Personal computer central processing unit (CPU) |
| 39 | Video mixer |
| 76* | Computer network |
| *not shown | |
| FIG. 12 | |
| 10 a, b, c, d | Display unit |
| 12 a, b, c, d | Video camera |
| 17 a, b, c, d | Video signal |
| 22 a, b, c, d | Personal computer central processing unit (CPU) |
| 38 a, b, c, d | Composite image |
| 39 | Video mixer |
| 76* | Computer network |
| 78 | Video bus |
| *not shown | |
| FIG. 13 | |
| 11 a, b, c | Workstation |
| 22 a, b, c, d | Personal computer central processing unit (CPU) |
| 36 | Combined signal |
| 25 a, b, c, d | Operator |
| 80 a, b, c, d | Audio interface |
| 82 a, b, c, d | Video interface |
| 84 a, b, c, d | Coder/decoder |
| 86 | Communication bus |
| FIG. 14 | |
| 11 a, b | Workstation |
| 12 a, b | Video camera |
| 15 a, b | Camera mounted polarizing filter |
| 19 a, b | Screen mounted polarizing filter |
| 22 a, b | Personal computer central processing unit (CPU) |
| 24 a, b | Stylus |
| 25 a, b | Operator |
| 72 a, b | Auxiliary loudspeaker |
| 74 a, b | Auxiliary microphone |
| 87 a, b | Front of large screen |

LIST OF REFERENCE NUMERALS

| | |
|---|---|
| 88 a, b | Large screen |
| 89 a, b | Rear of large screen |
| 90 a, b | Video projector |
| 92 a, b | Stylus position detector |
| 94 a, b* | Operator's shadow |
| *not visible | |
| FIG. 15 | |
| 12 | Video camera |
| 24 | Stylus |
| 72 | Auxiliary loudspeaker |
| 88 | Large screen |
| 90 | Video projector |
| 92 | Stylus position detector |
| 94 | Shadow image of collaborator |
| FIG. 16 | |
| 10 a, b | Display unit |
| 12 a, b | Video camera |
| 22 a, b | Personal computer central processing unit (CPU) |
| 25 a, b | Operator |
| 60 | Wall(s) |
| 66 a, b | Auxiliary video display |
| 70 a, b | Auxiliary video camera |
| 96 | Recording and playback facility |
| FIG. 17 | |
| 10 a, b | Display unit |
| 12 a, b | Video camera |
| 22 a, b | Personal computer central processing unit (CPU) |
| 25 a, b | Operator |
| 39 | Video multiplexer |
| 60 | Wall(s) |
| 70 | Auxiliary video camera |
| 98 | 2 or 3-D object |
| FIG. 18 | |
| 18 | Screen |
| 24 | Stylus |
| 38 | Composite image |
| 99* | Inset electronics |
| 100 | Inset |
| *not visible | |
| FIG. 19 | |
| 10 a, b | Display unit |
| 11 a, b | Workstation |
| 12 a, b | Video camera - used for one image channel |
| 25 a, b | Operator |
| 102 a, b | Shuttering spectacles |
| 112 a, b | Extra video camera - used second image channel |

What is claimed is:

1. An apparatus comprising:
a large screen means (88) for displaying a composite image (38); said large screen means (88) having a front (87) and a rear (89);
a video projection means (90) for projecting; said video projection means (90) mounted so as to project said composite image (38) onto said rear (89) of said large screen means (88);
a sensing means (20) for detecting position; said sensing means (20) being mounted adjacent to said large screen means (88);
a stylus means (24) for indicating position to said sensing means (20); said stylus means (24), being controlled by an operators hands (29);
a video camera means (12) for imaging; said video camera means (12) being mounted a short distance away from said large screen means (88) and aimed at said composite image (38);
a control means (15 and 19, 39, 42) for controlling video feedback; said control means (15 and 19, 39, 42) being mounted between said large screen means (88) and said video camera means (12);
a microphone means (74) for transmitting voice messages; said microphone means (74) being in close proximity to said large screen means (88);

a loudspeaker means (72) for receiving voice messages; said loudspeaker means (72 being in close proximity to said large screen means (88);

a computing means (22) for controlling said composite display (38); said computing means (22) being electrically connected to said video camera means (12), said sensing means (20), and said video projection means (88); and a communication cable means (34) for interconnecting said computing means (22); said communication cable means (34) being electrically connected to said computing means (22);

said control means (15 and 19, 39, 42) preventing said video camera means (12) from imaging said composite image (38);

said computing means (22) being able to produce said composite image (38) in response to motions of said stylus means (24) as detected by said sensing means (20), and in response to motions of an operator's hands (29), when held near said composite image (38) as detected by said video camera means (12).

2. The apparatus as claimed in claim 1, in which said control means 15 and 19, 39, 42 is a first polarizing filter (15) having a random orientation and a second polarizing filter (19) having an orientation orthogonal to said first polarizing filter (19); said first polarizing filter (15) being mounted in front of said video camera means (12); said second polarizing filter (19) being mounted adjacent to said composite image (38).

3. The apparatus as claimed in claim 1 in which said control means (15 and 19, 39, 42) is a video mixer (39) having a capability of combining video signals and having an electronic output signal (41) capable of being combined with other video signals in said computing means (22), said video mixer (39) electrically connected to said video camera means (12) and to said computing means (22).

4. The apparatus as claimed in claim 1 in which said control means 15 and 19, 39, 42 is a colored filter (42) having the capability to prevent said camera (12) from imaging said composite image (38).

5. The apparatus as claimed in claim 1 in which said sensing means (20) is a transparent digitizer (21).

6. The apparatus as claimed in claim 1 in which said sensing means (20) is an LED position detector (54).

7. The apparatus as claimed in claim 1 in which said sensing means (20) is a sonic position detector (58).

8. The apparatus as claimed in claim 1 in which said sensing means (20) is an infrared position detector (58).

9. The apparatus as claimed in claim 1 in which said sensing means (20) is said video camera means (12) combined with said computing means (22).

10. The apparatus as claimed in claim 1 further comprising:

a video mixer means (39) for mixing video signals; said video mixer (39) being electrically connected between said video camera means (12) and said computing means (22).

11. The apparatus as claimed in claim 1 further comprising:

a video mixer means (39) for mixing video signals; and a video bus means (78);

said video mixer means (39) being electrically connected between said video camera means (12) and said computing means (22) via said video bus means (78).

12. The apparatus as claimed in claim 1 further comprising:

an inset means (99) for placing a desired inset (100) in said composite display (38).

13. The apparatus as claimed in claim 1 further comprising:

a coder/decoder means (84) encoding and decoding signals; and a communication bus means (86);

said coder/decoder (84) being electrically connected to said video camera means (12), said auxiliary loudspeaker means (72), said auxiliary microphone means (74), said computing means (22), and said communication bus means (86).

14. The apparatus as claimed in claim 1 further comprising:

a recorder means (96) for recording and playing video images; said recorder means (96) being electrically connected to said computing means (22).

15. The apparatus as claimed in claim 1 further comprising;

an auxiliary video camera means (70) for imaging an object (98); a mixer means (39) for mixing video signals; said mixer means (39) being electrically connected to said video camera means (12), said auxiliary video camera means (70) and said computing means (22).

16. The apparatus as claimed in claim 10 further comprising:

an auxiliary video camera means (70) for imaging an object (98); said auxiliary video camera means (70) being electrically connected to said mixer means (39).

* * * * *